United States Patent [19]

Clausen et al.

[11] Patent Number: 5,433,932
[45] Date of Patent: Jul. 18, 1995

[54] PROCESS TO RECOVER AZIDE VALUES FROM AZIDE-BASED GAS GENERATING MATERIALS

[75] Inventors: John F. Clausen, Mesa, Ariz.; Christopher C. Shih, Torrance, Calif.

[73] Assignee: TRW Vehicle Safety Systems Inc., Lyndhurst, Ohio

[21] Appl. No.: 3,557

[22] Filed: Jan. 13, 1993

Related U.S. Application Data

[63] Continuation-in-part of Ser. No. 761,689, Sep. 18, 1991, abandoned.

[51] Int. Cl.⁶ .................... B01D 9/02; C01B 21/08
[52] U.S. Cl. .................... 423/208; 23/293 R; 23/295 R; 23/296; 149/35; 149/124; 423/410
[58] Field of Search ........... 149/35, 124; 423/410, 423/208; 23/293 R, 295 R, 296

[56] References Cited

U.S. PATENT DOCUMENTS

| | | | |
|---|---|---|---|
| 3,451,789 | 6/1969 | McIntosh | 149/124 |
| 5,034,070 | 7/1991 | Goetz et al. | 149/35 |
| 5,051,143 | 9/1991 | Goetz | 149/35 |

*Primary Examiner*—Wayne Langel
*Attorney, Agent, or Firm*—Tarolli, Sundheim & Covell

[57] ABSTRACT

In a process for recovering an alkali metal azide from a waste gas generating material containing the alkali metal azide and a metal oxide reactable with the azide, the gas generating material is mixed with a solvent for the alkali metal azide. This produces a slurry comprising (i) a solution comprising the solvent and the alkali metal azide, and (ii) the metal oxide. The slurry is separated into a liquid stream comprising primarily the solution and a sludge stream comprising primarily the metal oxide. The liquid stream is filtered in a filter to produce a filtrate which is substantially free of metal oxide and is then concentrated by evaporation of the solvent to produce crystals of the alkali metal azide. The separation may be carried out by a filter or centrifuge to produce a filter or centrifuge cake. The sludge obtained from the slurry is reslurried to recover additional azide, and the resulting slurry is again separated into a sludge and a liquid stream by a filter or centrifuge. The filtrate or centrate is recycled and can be used for dissolution of additional waste gas generating material.

45 Claims, 5 Drawing Sheets

5,433,932

PROCESS TO RECOVER AZIDE VALUES FROM AZIDE-BASED GAS GENERATING MATERIALS

This is a continuation-in-part of application Ser. No. 07/761,689 filed on Sep. 18, 1991, abandoned.

BACKGROUND OF THE INVENTION

1. Technical Field

The present invention relates to the manufacture of vehicle occupant restraint systems, and more particularly to a process for recovering alkali metal azide values from waste gas generating material produced during the manufacture of such restraint systems.

2. Description of the Prior Art

Most vehicle occupant restraint systems today use a gas generating material which comprises, as one ingredient, an alkali metal azide. The gas generating material also comprises a reactant for the azide, usually a metal oxide such as copper oxide or iron oxide. The gas generating material may further comprise a water-soluble oxidant such as sodium nitrate. A coating containing potassium perchlorate and other ingredients may be applied to the gas generating material. The gas generating material may also comprise other ingredients, such as bentonite, graphite, and silica.

In the manufacture of the gas generating material, the ingredients are mixed and formed into a desired shape, such as tablets, granules or multi-holed cylinders known as grains. When ignited, the gas generating material produces nitrogen gas. During the manufacture of the gas generating material and the formation of the material into shapes, waste gas generating material is produced. Waste gas generating material can also be produced during handling of the formed shapes of gas generating material, for instance in packaging the shaped material. Further, waste gas generating material can result because of a failure of the grains to pass certain tests.

Alkali metal azides are expensive. The disposal of alkali metal azides is also expensive. A need exists for a method to recover alkali metal azides from waste gas generating material. The method has to be economical and capable of producing an azide product which meets certain specifications permitting reuse of the azide as feedstock in the manufacture of additional gas generating grains. The method also must be capable of processing waste gas generating materials having different compositions. Further, the method has to be capable of producing side streams which contain no azide residuals and which are suitable for either reclaiming or proper disposal. For instance, a waste side stream of a metal oxide or a water-soluble oxidant which is contaminated with sodium azide could have the wrong composition for reclaiming and could be considered hazardous, making it unsuitable for landfill disposal.

SUMMARY OF THE INVENTION

The present invention resides in a process for recovering an alkali metal azide from waste gas generating material containing the alkali metal azide. The waste gas generating material also contains a metal oxide reactable with the azide. The waste gas generating material, in a first step, is mixed with a solvent for the alkali metal azide. This produces a slurry comprising (i) a solution comprising the solvent and the alkali metal azide and (ii) the metal oxide. The slurry is separated into a liquid stream comprising primarily the solution and into a sludge stream comprising primarily the metal oxide. The liquid stream is filtered to remove residual metal oxide and is then concentrated in a crystallization process to produce crystals of the alkali metal azide which are recovered and can be reused.

The sludge stream may be reslurried to extract additional azide from the metal oxide, and the resulting slurry may again be separated, in a second separation step, to produce a filter or centrifuge cake and a filtrate or centrate. The filtrate or centrate may be recycled and used to dissolve waste gas generating material. The filter or centrifuge cake comprises primarily metal oxide and can be disposed of or reclaimed.

A preferred solvent is water. A preferred gas generating material contains sodium azide and iron oxide and/or copper oxide. Preferably, the separation of the slurry into a liquid stream and a sludge stream is carried out on a continuous basis by centrifugation, producing a centrate which is filtered and concentrated. Following the crystallization step, the alkali metal azide crystals are preferably centrifuged to remove liquor from the crystals. The crystals are then dried.

Preferably, when the gas generating material comprises at least one water soluble oxidant in addition to the alkali metal azide, the crystallization process is carried out by: (a) concentrating the liquid stream in a first concentration step to produce pure crystals of alkali metal azide and a mother liquor; (b) further concentrating the mother liquor to remove additional crystals of the azide from the mother liquor, the further concentration also removing some water soluble oxidant from the mother liquor; and (c) subjecting the mother liquor from either (a) or (b) to fractional crystallization by cooling to crystallize the water soluble oxidant selectively from the mother liquor. Depending on the properties of the soluble components, the aforementioned steps can be carried out in different sequences.

Any water soluble oxidant which is crystallized can be subjected to ozonation to destroy any residual azide with the water soluble oxidant and then disposed of or reclaimed. The blend of crystals of azide and water soluble oxidant from (b) can be recycled for reprocessing. Also, the filter cake or centrifuge cake from the second separation step, containing primarily metal oxide, can be treated, prior to disposal or reclaiming, by ozonation or other chemical decomposition of alkali-metal azide to destroy residual alkali metal azide in the cake. The remaining metal oxide cake can then be disposed in a landfill or reclaimed. Alternatively, the cake, containing primarily metal oxide, can be treated by countercurrent washing to make the cake suitable for landfill or reclamation.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF A PREFERRED EMBODIMENT

In the following description, the two digit numbers which are used in the accompanying Figures refer to process lines. The three digit numbers which are used refer to other apparatus in the accompanying Figures. The encircled capital letters which are used in the Figures indicate points of connection of process lines in one Figure with points of connection of process lines which are similarly indicated in other Figures.

The process of the present invention can be divided into four major steps—a first extraction and solution clarification step, a second product crystallization process, a third product separation and mother liquor recovery step and a fourth solids processing step. The following description will cover each of these steps in sequence.

In the practice of the present invention, if waste gas generating materials of different compositions are being processed, the process will first be carried out with one of the materials, and then with another of the materials, in sequence. The equipment is sized to accommodate storage of streams of a material not being processed while the other material is being processed. The size of the storage and amount of processing time devoted to one waste gas generating material depends upon the amount of the gas generating material required to be processed. For instance, while one material is being processed, an amount of the other material, equivalent to up to several weeks processing time, may be stored.

All percentages are percentages by weight unless otherwise specified.

Preliminary Extraction and Solution Clarification Steps

Figure 1:
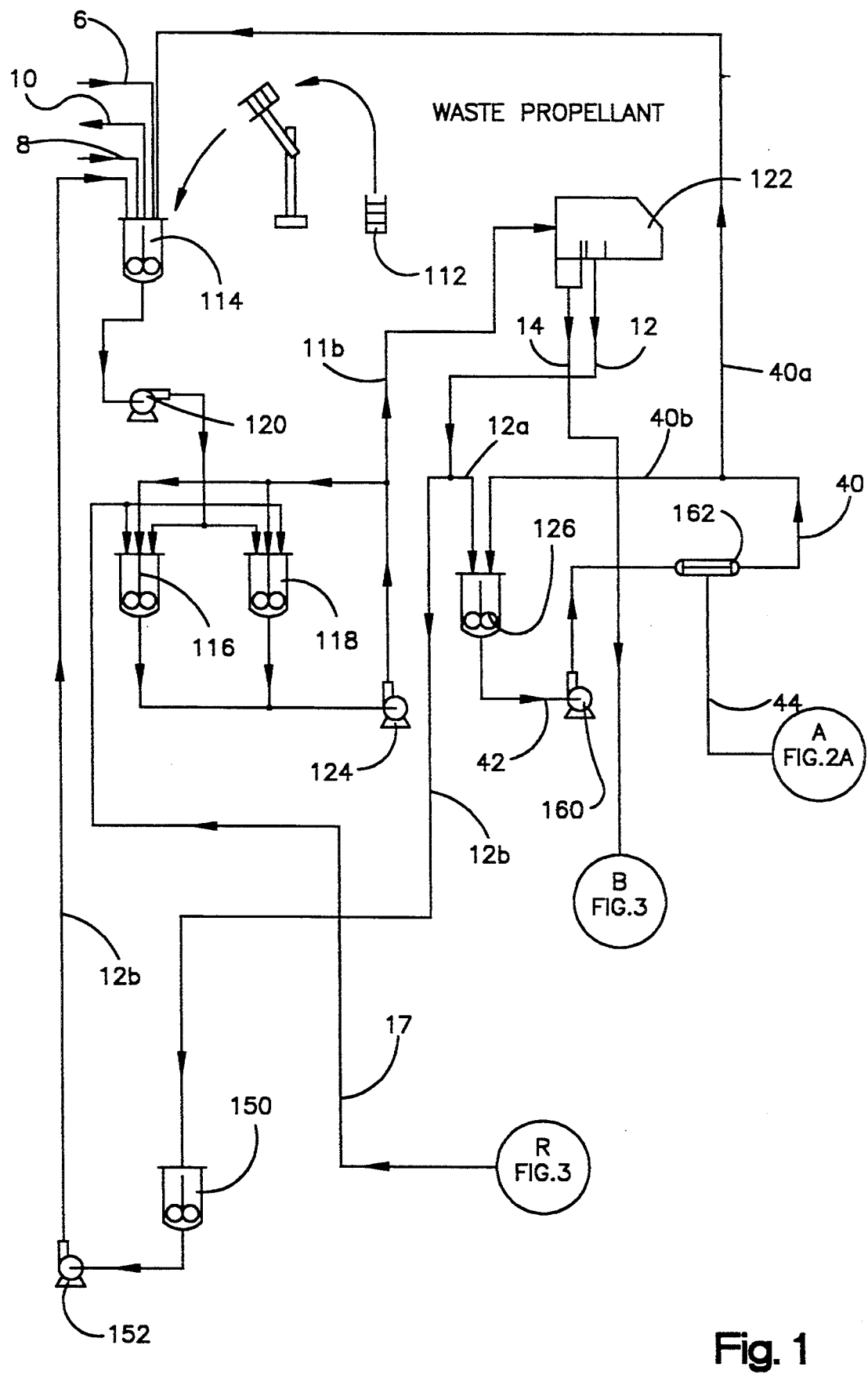
FIG. 1 is a flow diagram illustrating preliminary extraction and solution clarification steps of the present invention.

Referring to FIG. 1, containers 112 of solid waste gas generating material are dumped into a premix vessel 114. A solvent is added in line 6 to the premix vessel 114. Solvent is also recycled to premix vessel 114, for instance in line 12b, in a manner to be described. The combined amounts of solvent added to the premix vessel 114 are in excess of that required to dissolve the soluble components of the gas generating material. The amount of solvent required to be added in line 6 may be relatively small. A preferred solvent in the process of the present invention is water. However, those skilled in the art will recognize that other solvents can be used. The process of the present invention will be described with reference to water as the solvent.

Examples of water soluble components of the waste gas generating material are alkali metal azides, such as sodium azide, potassium azide, and lithium azide, and water soluble oxidants, reactable with the azides, such as alkali metal or ammonium nitrates, alkali metal or ammonium chlorates, and alkali metal or ammonium perchlorates. Sodium azide is a preferred alkali metal azide, and sodium nitrate and potassium perchlorate are examples of water soluble oxidants. The waste gas generating material may also contain combinations of water soluble oxidants. For instance, the waste gas generating material may comprise sodium nitrate from waste formed shapes of gas generating material and, in addition, potassium perchlorate from waste coating material for the formed shapes.

The waste gas generating material can also contain an insoluble component, such as a metal oxide, reactable with the azide to produce nitrogen gas. The metal of the metal oxide may be any metal lower in the electromotive series than the alkali metal. Examples of suitable metals are iron, copper, manganese, tin, titanium and nickel. Preferred metal oxides are iron oxide, e.g., ferric oxide, and copper oxide, e.g., cupric oxide. The metal oxide in the gas generating material is normally present in an amount slightly in excess of the stoichiometric amount required to react with all of the azide.

The waste gas generating material also may contain an extrusion aid such as bentonite, strengthening fibers, such as graphite fibers, and other ingredients. Such ingredients are normally water-insoluble and present in small amounts, if at all.

Examples of suitable gas generating compositions are disclosed in U.S. Pat. No. 3,895,098 to John F. Pietz, issued Jul. 15, 1975 and reissued Jan. 26, 1988 as Re. 32,584, entitled "Method and Composition for Generating Nitrogen gas". Among the gas generating compositions disclosed in the subject patent are those which comprise a mixture of sodium azide with approximately a stoichiometric amount of copper oxide or iron oxide.

Also, a composition as disclosed in U.S. Pat. No. 4,604,151, issued on May 8, 1986 to Gregory Knowlton and John Pietz can be used. This patent is entitled "Method and Composition for Generating Nitrogen Gas Including Ammonium Perchlorate Catalyst."

Sodium hydroxide is also added to the vessel 114, in line 8, in an amount to maintain the pH of the slurry in the vessel 114 at an efective pH, preferably above about 10, to prevent the formation of hydrazoic acid. Hydrazoic acid is toxic and can be explosive. A preferred pH is in the range of 10 to 12.5. A pH less than 12.5 may be desirable to impede the formation of copper azide where the metal oxide is copper oxide. Alternatively, the water in line 6 can be premixed with sodium hydroxide for proper pH adjustment prior to adding the water to vessel 114. The premix vessel 114 is vented, in line 10, to a venturi scrubber or other similar device which prevents hazardous fumes or particulates from the vessel 114 from entering the atmosphere.

The mixture in vessel 114 is agitated for whatever time is necessary, and at a sufficient intensity, to break up large particles of the waste gas generating material. Also, some leaching of the water soluble components of the waste gas generating material from the water insoluble components occurs in the premix vessel 114. This step of the process is carried out on a batch basis.

If desired, the solids of the waste gas generating material can be comminuted, for instance by wet grinding, prior to being introduced into the vessel 114 to reduce the average particle size of the waste gas generating material and facilitate leaching the water soluble components from the water insoluble components. However, such comminuting of the waste gas generating material generally is not necessary.

It should be understood that the waste gas generating material which is received for processing can be in a form other than a solid in containers 112. For instance, the waste gas generating material can be in a solution or slurry form, depending upon the source of the waste. For instance, certain process or cleaning steps in the manufacture of the gas generating material can generate a liquid waste.

When the large particles of the gas generating material are substantially broken-up, the premix in vessel 114 is transferred to a main leach vessel 116 or 118, by means of a slurry transfer pump 120. The premix is further agitated in one or the other of vessels 116, 118 thereby extracting most of the remaining undissolved water soluble components of the waste gas generating material from the insoluble solid particles. The agitation also maintains the slurries in leach vessels 116, 118 in an essentially homogeneous state. This is a first extraction step in the process of the present invention.

The slurries in the main leach vessels 116, 118 are then fed through line 11b to a slurry centrifuge 122 using the slurry pump 124. The slurry centrifuge 122 operates on a continuous basis, and pump 124 functions as a centrifuge feed pump. Slurry is drawn from only one of the leach vessels 116, 118 at a time.

The slurry centrifuge 122 separates the slurry mixture into a centrate stream comprising water and dissolved water soluble components, in line 12, and a sludge stream comprising water insoluble components, in line 14. In practice, each batch of waste gas generating material added to the premix vessel 114, from containers 112, is subjected to two extractions in leach vessels 116, 118. The second extraction, after the above first extraction, comprises reslurrying the sludge stream in line 14 and recycling the slurry, in a manner to be described, in line 17 (FIG. 1) to the leach vessels 116, 118, for reseparation in centrifuge 122.

The centrate from the centrifuge 122, in line 12, divides either into line 12a or line 12b. Line 12a receives the centrate from the first extraction step. Line 12b receives the centrate from the second extraction step. In the first extraction step, the centrate from the centrifuge 122, in line 12a, is collected in holding vessel 126. The centrate at this point has a relatively high concentration of sodium azide in it. In the second extraction step, the centrate from the centrifuge 122, in line 12b, is collected in holding vessel 150. This centrate has some solids in it. When the second extraction step has been completed, the centrate, with some solids in it, is recycled in line 12b to the premix vessel 114, by pump 152 and is combined with the next batch of waste gas generating material to be processed.

The centrate stream in centrate holding vessel 126, from the first extraction step, is fed in line 42 by means of feed pump 160 to a filter 162. The filter 162 can be any filter capable of producing a filtrate which is substantially free of metal oxide. A preferred filter 162 is a polishing filter such as a membrane filter which functions to clarify the centrate. The centrate is permeated through the membrane of the filter. The centrate is recycled in line 40b to the holding vessel 126, and thus is pumped through the membrane filter many times, producing a clarified permeate in line 44.

The polishing filter 162 also ultimately produces a concentrated solution in line 40, which is relatively high in solids content. By way of example, the solution in line 40 can be concentrated from an initial concentration of about 0.5%–1% solids to a final concentration of about 12% solids. This concentrated solution is then recycled to the premix vessel 14 by means of line 40a.

Figure 2A:
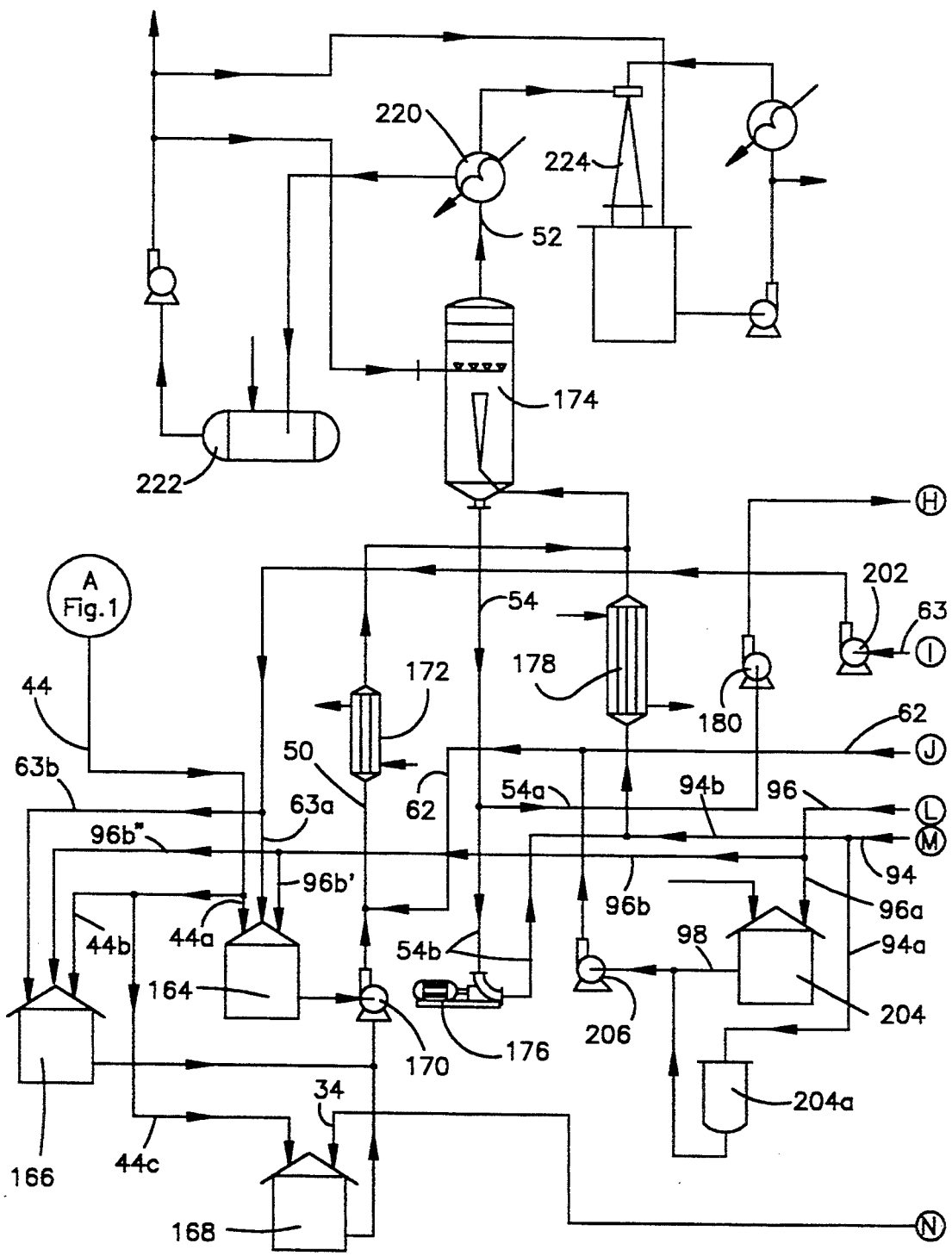
FIG. 2A is a flow diagram illustrating the product crystallization process of the present invention.
Figure 2B:
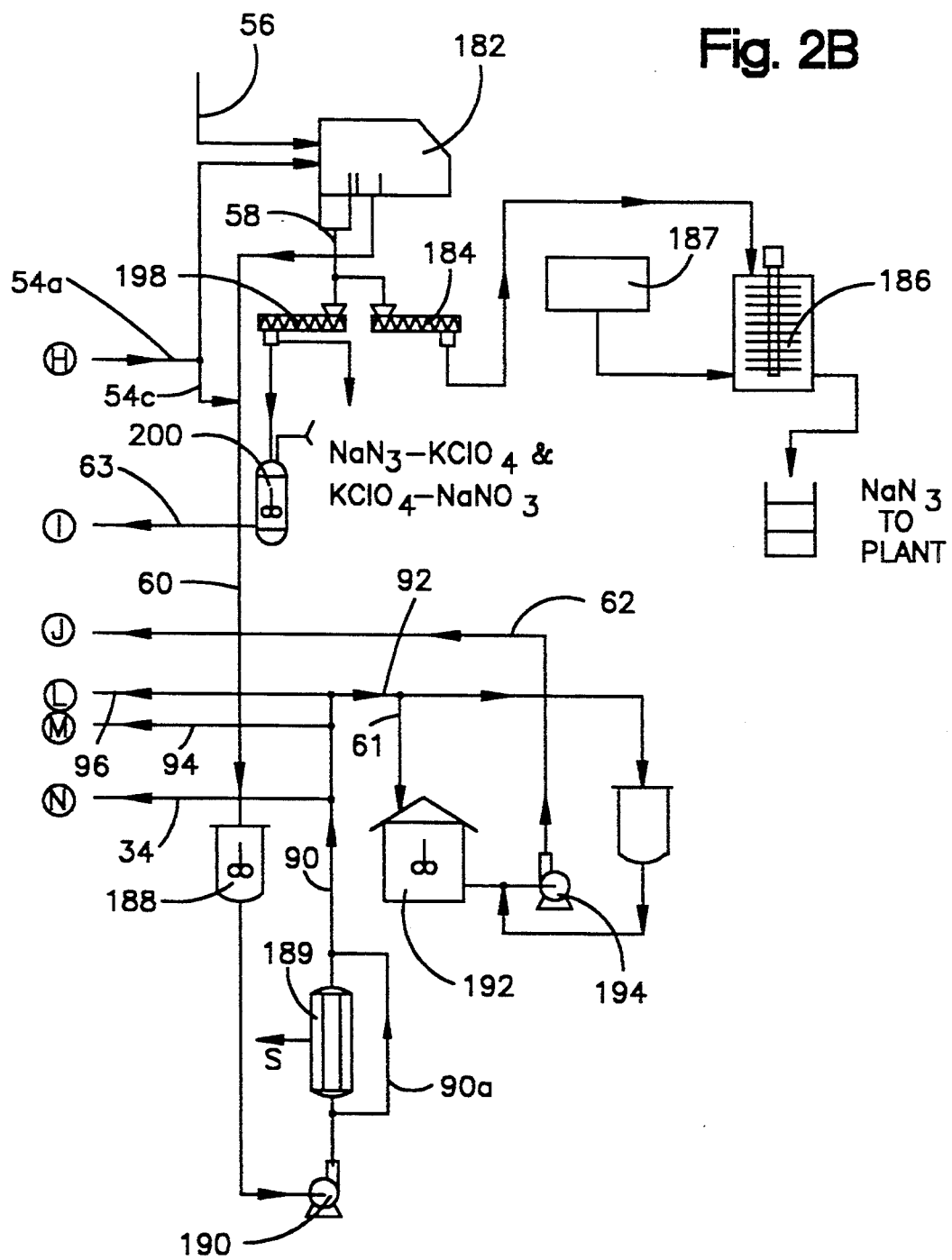
FIG. 2B is a flow diagram illustrating product separation and mother liquor recovery steps of the present invention.
Figure 4:
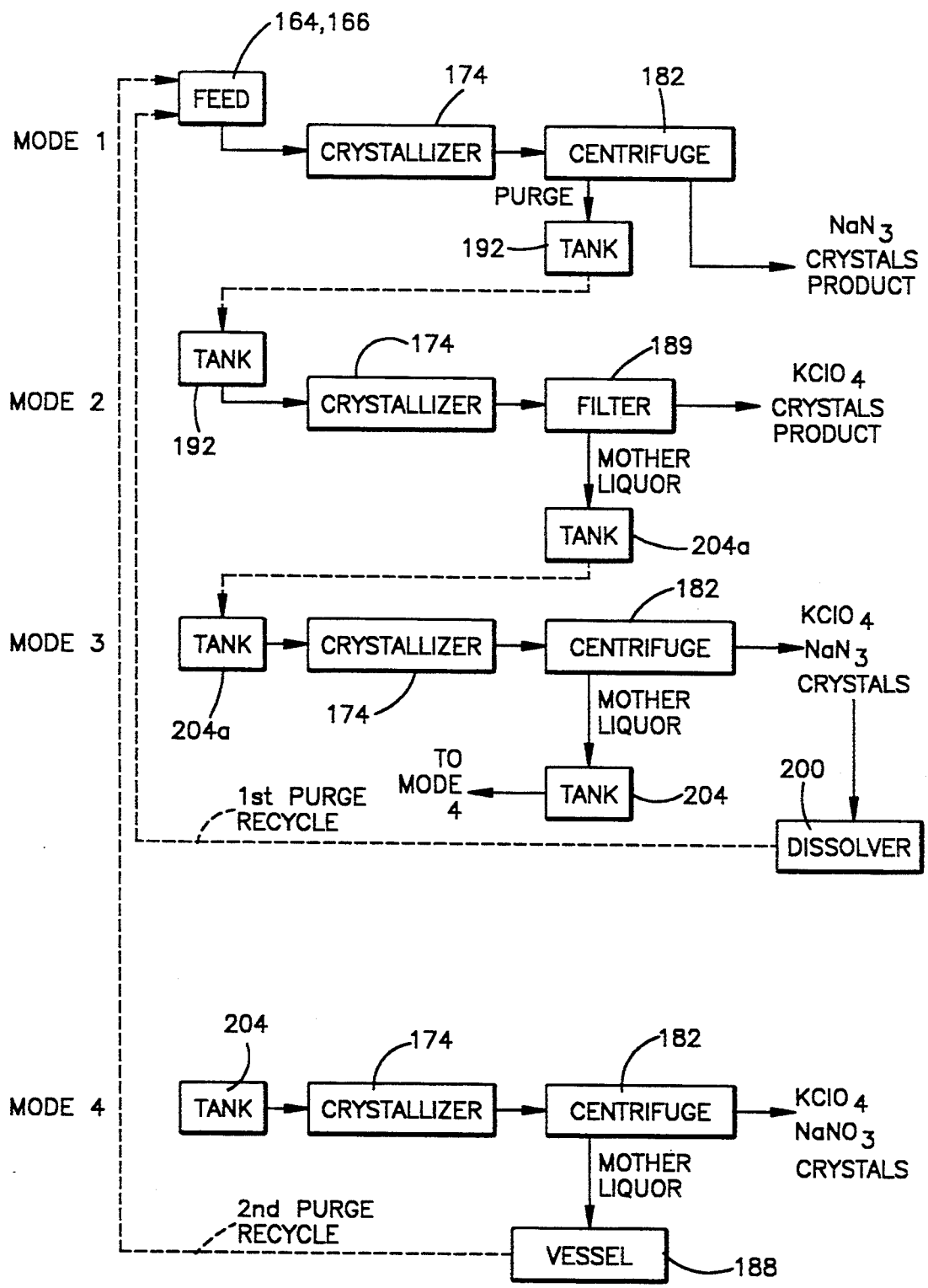
FIG. 4 is a schematic flow diagram illustrating multiple modes of operation in the crystallization process of FIG. 2A.

Process Crystallization Process and Product Separation and Mother Liquor Recovery Step The two steps, "product crystallization" and "product separation and mother liquor recovery" will be discussed together. Referring to FIGS. 2A, 2B and 4, the permeate in line 44 (FIG. 2A) is a clarified solution.

Encircled letter "A" indicates the point of connection of line 44 in FIG. 2A with line 44 in FIG. 1. The permeate flows in line 44a or 44b (FIG. 2A) to either of two storage tanks 164 or 166, or in line 44c to storage tank 168.

The purpose for multiple storage tanks 164, 166 and 168, for the clarified permeate in line 44, is to accommodate permeate of different compositions. For instance, the waste gas generating material may be a passenger side gas generating material, or the waste gas generating material may be a driver side gas generating material. The composition for a passenger side gas generating material may be different than the composition for a driver side gas generating material. For instance, the passenger side gas generating material can comprise mainly ferric oxide, sodium azide, and sodium nitrate. The passenger side gas generating material can also comprise potassium perchlorate from a coating for the formed shapes of gas generating material. The driver side gas generating material can comprise primarily cupric oxide and sodium azide. Also, during processing of the passenger side gas generating material, impure sodium azide crystals will be produced in a manner to be described. These impure sodium azide crystals are stored in either storage tank 164 or 166, to be mixed with a next batch of passenger side clarified permeate. For these reasons, separate storage tanks 164, 166, 168 are provided for passenger side clarified permeate and driver side clarified permeate. As shown in FIG. 2A, more storage is provided for passenger side permeate (two tanks 164, 166) than driver side permeate (single tank 168).

The permeate from any of the storage tanks 164, 166 and 168 is pumped in line 50 by pump 170, to a heat exchanger 172 where the permeate is preheated. The heat exchanger 172 is an indirect heat exchanger. The heated permeate then flows in line 50 to a crystallizer 174. The crystallizer produces a vapor stream in line 52 and a mother liquor containing crystals of high purity in line 54.

The vapor stream in line 52 flows overhead to condenser 220 from which it flows to either condenser receiver 222 or to vacuum ejector 224. The overhead apparatus broadly is conventional, but permits the crystallizer to be operated in a number of different modes. For instance, if the waste material being processed is driver side gas generating material, the permeate in line 50 leading to the crystallizer may be primarily sodium azide and water. The crystallizer, in this instance, functions as a simple evaporator producing a mother liquor in line 54 which contains pure crystals of sodium azide, and a water vapor stream in line 52. The crystallizer may be operated under vacuum with recovery of the condensate in the vacuum ejector 224.

If the waste material is primarily passenger side gas generating material, the permeate in line 50 can comprise sodium nitrate, and/or other water soluble oxidants, such as potassium perchlorate, in addition to sodium azide and water. In this instance, the crystallizer 174 is operated as a fractional crystallizer. The crystallizer is operated under conditions that produce a mother liquor containing primarily sodium azide crystals in line 54, and a water vapor stream in line 52. The mother liquor also contains dissolved sodium azide, sodium nitrate, and potassium perchlorate. The crystallizer is operated at atmospheric pressure, and the vapor stream is condensed in condenser 220 and collected in condensate receiver 222.

Line 54 containing mother liquor from the crystallizer 174 divides into two lines 54a and 54b. The crystallizer 174 is operated on a cyclical basis. During a crystallizer cycle, a portion of the mother liquor and entrained sodium azide crystals in line 54 is recycled in line 54b, by pump 176, through reheater 178 back to the crystallizer 174. A portion of the mother liquor and entrained sodium azide crystals is pumped in line 54a by centrifuge feed pump 180 to centrifuge 182 (FIG. 2B). The encircled letter "H" indicates the point of connection of line 54a of FIG. 2A with line 54a of FIG. 2B. This cycle is maintained until all of the centrate in a storage tank or tanks 164, 166, 168 is consumed.

Centrifuge 182 is preferably a pusher centrifuge, which incorporates water washing to remove residual solution from the crystal surfaces. Distilled water is introduced into the pusher centrifuge in line 56 (FIG. 2B). Alternatively, a screen centrifuge can be used. The centrifuge 182 produces a centrate stream in line 60 and a centrifuge cake in line 58.

The centrifuge cake in line 58 is a wet cake which contains pure crystals of sodium azide. The crystals of sodium azide are transferred to screw conveyor 184 which in turn transfers the crystals to a sodium azide crystal dryer 186. Preferably, drying in dryer 186 is carried out under a nitrogen blanket, from nitrogen generator 187, to prevent combustion of the azide crystals. The crystals are dried from about 5% by weight moisture to about 0.04%–1% moisture. This produces a sodium azide feedstock which meets specifications for making additional gas generating material.

During this operation, the mother liquor (centrate) from the pusher centrifuge 182, in line 60, flows to a receiver tank 188. From the receiver tank 188, the centrate is pumped, by pump 190, in line 90, to line 94 where it is recycled in line 94b (FIG. 2A) through the reheater 178 to the crystallizer for reprocessing. Encircled letter "M" indicates the point of connection of line 94 in FIG. 2B with line 94 in FIG. 2A. The centrate is recycled in line 94, 94b, for combining with the recycle in line 54b, to recover, by crystallization, additional crystals of sodium azide. This recycle is maintained until the end of a crystallization cycle.

During a crystallization cycle, a portion of the centrate in line 90, from receiver tank 188 and pump 190, can be withdrawn as purge in lines 92, 61 (FIG. 2B) for storage in tank 192. This purge through lines 92, 61, can be an important part of the crystallizer operation depending upon the composition of the gas generating material, and will be described in further detail below.

At the end of a crystallization cycle, processing a batch from any of the feed tanks 164, 166, 168, the mother liquor is then pumped, by pump 190 (FIG. 2B) to one of several holding tanks, to be described.

Preferably the mother liquor is recycled, during a crystallization cycle, by pump 190, through an in-line filter 189 in line 90. The in-line filter removes small crystals of sodium azide entrained in the mother liquor, in the line marked "S", which are thus recovered and returned to the crystallizer feed tanks 164, 166, 168 for reprocessing. If desired, the flow in line 90 can be bypassed around filter 189, in bypass line 90a.

If the feed to the crystallizer 174 (FIG. 2A) is waste driver side gas generating material, from feed tank 168, it may contain only water and sodium azide. In this case, the crystallizer 174 is operated as a vacuum evaporator. Processing a feed stream from feed tank 168 may take several days of operation of the crystallizer 174.

During operation of the crystallizer, a portion of the liquor in line 54 is recycled through reheater 178, and a portion is withdrawn in line 54a to centrifuge 182, FIG. 2B. Centrate from the centrifuge, in holding tank 188, is also recycled in lines 94, 94b through reheater 178. Streams withdrawn during this cycle are the overhead vapor stream in line 52 from the crystallizer 174 and the crystal stream from centrifuge 182 to dryer 186. This processing is continued until all of the feed from tank 168 is exhausted. The mother liquor at this point, in holding tank 188, is a dilute solution of dissolved sodium azide and water. The mother liquor is recycled back to tank 168 (FIG. 2A) in line 34, combined with fresh driver side centrate from centrifuge 122 (FIG. 1), and received for a next cycle of concentration of driver side waste gas generating material in crystallizer 174. Encircled letter "N" indicates the point of connection of line 34 in FIGS. 2A and 2B.

If the waste gas generating material is passenger side gas generating material, it may contain water soluble salts, such as sodium nitrate and potassium perchlorate, in addition to sodium azide. For such material, an operating cycle broadly the same as the above, for driver side material, is used. At the end of an operating cycle, dilute mother liquor is recycled in lines 96, 96b (via point of connection "L" of FIGS. 2A and 2B) and lines 96b' and 96b'' for storage in tank 164 or 166 to be combined with permeate feed from a next extraction and clarification step. In this instance, however, through extraction of sodium azide from multiple feeds of waste gas generating material, a build-up of such salts will occur, over time, in the mother liquor which is stored in tanks 164, 166. It thus becomes necessary to purge the mother liquor of such salts. This is accomplished by operating the crystallizer 174 and centrifuge 182 in a mode or plurality of modes other than the above mode of normal operation. The following Example illustrates operation of the process in the several modes to accomplish this purge.

In the following Example, a process cycle is defined as the plurality of steps undertaken in sequence to process a centrate batch, in storage tanks 164, 166, from centrifuge 122 (FIG. 1). A mode of operation is one step in the cycle.

Example

This Example illustrates processing a centrate portion, in line 12a of FIG. 1, of a waste gas generating material which comprises multiple water soluble oxidants in addition to sodium azide and a metal oxide. The waste gas generating material is passenger side material and in this Example comprises both sodium nitrate and potassium perchlorate. The sodium nitrate comes from waste passenger side material from formed shapes. The potassium perchlorate comes from waste passenger side coating material.

The centrate, during a process cycle of centrifuge 122 (FIG. 1), flows in line 12a, and then as permeate in line 44, to either storage tank 164 or 166 (FIG. 2A) where the permeate is stored. The permeate comprises, on a weight basis, about 21.8% $NaN_3$, about 0.7% $NaNO_3$, about 0.5% $KClO_4$, and about 77% $H_2O$.

The permeate, during each cycle, is combined, in tank 164 or 166 with two purge recycle streams which are obtained from a previous batch and which will be described in more detail below. The term "purge recycle" distinguishes these two streams from other recycle streams in the process, and also identifies the streams as emanating from a purge mode in the process.

One purge recycle stream, hereinafter referred to a the first purge recycle, flows from a solids dissolver 200 (FIG. 2B) by means of line 63. This purge recycle stream is generated during a third mode of operation to be described. The purge recycle stream is pumped by pump 202 (FIG. 2A) through either line 63a or 63b into tank 164 or 166. Encircled letter "I" indicates the point of connection of line 63 in FIG. 2B with line 63 in FIG. 2A. The purge recycle stream comprises primarily dissolved crystals of sodium azide with some dissolved crystals of potassium perchlorate. The amount of the purge recycle stream is about 6% of the weight of the centrate from centrifuge 122.

The other purge recycle stream, hereinafter referred to as the second purge recycle stream, flows to tank 164 or 166 (FIG. 2A), in line 96b' or 96b". This purge recycle stream constitutes a centrate of concentrated mother liquor from centrifuge 182 (FIG. 2B) and receiving tank 188 and is generated during a fourth mode of operation. The concentrated mother liquor is pumped to tank 164 or 166 by pump 190. Encircled letter "L" indicates the point of connection of line 96 in FIG. 2B with line 96 in FIG. 2A. The concentrated mother liquor contains mostly amounts of sodium azide and sodium nitrate. The amount of this purge recycle stream is about 4% of the amount of centrate from centrifuge 122.

The feed tank 164, 166 may also receive a very small amount of sodium azide fines, from filter 189, FIG. 2B, to be described. Enough excess water is present in feed tanks 164, 166 to dissolve the azide fines recycled to the feed tanks.

An amount of diluting water is added to the feed tanks 164, 166. This amount is about 26% of the weight of the permeate in the feed tanks from centrifuge 122.

In each cycle, the feed tanks 164, 166 function as storage tanks. Centrate from centrifuge 122 and the purge streams derived from processing of the current batch are stored for a next cycle. In the next cycle, feed is drawn from one or the other of the feed tanks 164, 166. This feed is pumped in line 50 (FIG. 2A) to the crystallizer 174. In each cycle, the crystallizer 174 in this Example is operated in four modes. These modes are in sequence. This is illustrated in FIG. 4.

First Mode of Operation of the Crystallizer 174

The first mode involves processing the permeate from centrifuge 122 and purge recycle in tanks 164, 166, as shown in FIG. 4. The purpose of the first mode of operation of the crystallizer 174 is to obtain a product stream of pure sodium azide crystals from the feed in tanks 164, 166. The feed at this point has the following composition: about 21% $NaN_3$, about 1.4% $NaNO_3$, about 1.0% $KClO_4$, and about 76.6% water.

In this mode, the crystallizer 174 is operated in an evaporative mode, as a fractional crystallizer. Water is boiled from the feed, in the crystallizer 174, and evaporated into overhead line 52, FIG. 2A. The fractional crystallization of sodium azide from the feed is possible due to the higher concentration of sodium azide in the feed, along with the relative solubilities of sodium azide, sodium nitrate, and potassium perchlorate. In this fractional crystallization step, the potassium perchlorate and sodium nitrate remain in solution.

The crystallizer 174 is operated in this mode for most of a process cycle. By way of example, the crystallizer 174 may be operated in this first mode of operation for about 120 hours. During the first mode of operation, the crystallizer is operated on a recycle basis, which comprises (i) pumping the slurry, by means of pump 176 (FIG. 2A) through reheater 178 back to the crystallizer 174; (ii) pumping a small portion of the slurry, by means of pump 180, in line 54a, to centrifuge 182 (FIG. 2B); and (iii) recycling the mother liquor from receiving tank 188, by means of pump 190, in line 94, through reheater 178 back to the crystallizer 174. During this recycle, a product stream of centrifuge cake (i.e., $NaN_3$ crystals) is withdrawn from the centrifuge 182, onto the screw conveyor 184 (FIG. 2B), which conveys this product stream to dryer 186. In the centrifuge step, the centrifuge cake is washed with wash water, which is then added to the mother liquor recycled to the crystallizer 174.

As mentioned above, a portion of the centrate from receiving tank 188 is also withdrawn, as a first purge, through lines 92 and 61 and stored in tank 192 (FIGS. 2B and 4). The amount of the purge withdrawn to tank 192 is about 22% of the total feed in tanks 164, 166. The composition of the first purge, at the end of a cycle is about 26% $NaN_3$, 9% $NaNO_3$, 6% $KClO_4$, and 59% water. This is substantially higher in relative amounts of $NaNO_3$ and $KClO_4$ than the feed at the beginning of the cycle, due to the withdrawal of $NaN_3$ to dryer 186.

The centrifuge cake which is obtained from centrifuge 182 is a wet cake consisting essentially of sodium azide. The amount of azide obtained in a cycle is essentially equal to the amount of azide in the centrate stored in tanks 164, 166, from centrifuge 122 (FIG. 1). For instance, if tanks 164, 166 provide a raw feed to the crystallizer 174 of about 212 pounds per hour sodium azide, the rate of recovery of crystals of sodium azide in the wet cake from centrifuge 182 is also about 212 pounds per hour.

The amount of water in the wet cake, on screw conveyor 184, is less than 5% as indicated above. The cake (crystals of the $NaN_3$) is dried, in dryer 186, to 0.04%–1% moisture. The amounts of sodium nitrate and potassium perchlorate in the wet cake are very small, less than about 0.1% each. Thus, the sodium azide, which is recovered from dryer 186, is suitable for reuse in the manufacture of additional gas generating material.

At the end of this first mode of operation, when all of the feed in tanks 164, 166 is exhausted, the mother liquor from the crystallizer 174, and centrifuge 182, flows to receiver tank 188 (FIG. 2B), and from there is pumped, by pump 190, in lines 92, 61, for storage in tank 192 (FIGS. 2B and 4). The mother liquor is preferably pumped through the filter 189 (FIG. 2B) in line 90, which removes sodium azide fines from the mother liquor. The sodium azide fines are then recycled to the feed tanks 164, 166 and added to the feed for the next cycle of operation of the process.

Second Mode of Operation of the Crystallizer

The purpose of this second mode of operation of the crystallizer 174 is to crystallize and thus purge potassium perchlorate from the purge stream in tank 192 (FIGS. 2B and 4) from mode 1. From the above, it is apparent that the potassium perchlorate and sodium nitrate in the purge stream, in tank 192, are in a more concentrated state, relative to the sodium azide, than at the beginning of the cycle.

The feed in tank 192 is diluted with about 8.7% water, based on the weight of the feed in the tank 192. The diluted feed is then fed to the crystallizer 174, by means of pump 194, in line 62. Encircled letter "J" indicates the point of connection of line 62 in FIG. 2A with line 62 in FIG. 2B.

The crystallizer 174 is operated in a cooling mode, using heat exchanger 178 as a cooler, instead of in a heating mode, cooling the feed from an inlet temperature of about 167° F. to an exit temperature of about 124° F. The solubility of potassium perchlorate is more temperature sensitive than that of sodium azide, and potassium perchlorate preferentially crystallizes from the feed during this cooling step. Although the cooling takes place in heat exchanger 178, the crystallization takes place in crystallizer 174.

The slurry from the crystallizer 174, in line 54, is very thin. Accordingly, a portion of the slurry is withdrawn in line 54a and then directed in line 54c (FIG. 2B) to receiving tank 188, bypassing the centrifuge 182. The slurry is then pumped, by pump 190, through filter 189. This produces a wet solids stream in filter 189 comprising primarily crystals of potassium perchlorate, and a clear mother liquor which flows in lines 94 and 94a to tank 204a (FIGS. 2A and 4) where it is stored. Encircled letter "M" indicates the point of connection of lines 94 of FIGS. 2A and 2B. The remaining portion of the slurry is recycled, by pump 176, in line 54b, through the heat exchanger 178, functioning as a cooler back to the crystallizer 174.

This mode of operation of the crystallizer is operated for only a relatively short period of time, for instance about ten to thirty hours of a month cycle, until the feed from tank 192 is exhausted. The length of operation depends on the amount of potassium perchlorate present in the waste feed.

The weight of potassium perchlorate crystals recovered from filter 189 represents about 5% of the weight of potassium perchlorate in the mother liquor received from tank 192. The potassium perchlorate crystals can be reused for additional coating material.

The mother liquor in tank 204a contains about 25% NaN$_3$, about 8% NaNO$_3$, about 4% KClO$_4$, and about 63% H$_2$O.

It is understood that if the waste material being processed does not contain potassium perchlorate or contains only a small amount of potassium perchlorate, this mode of operation need not be used in the process. Also, part of the purge stream in tank 192 may bypass this mode and be fed directly to the third mode.

Third Mode of Operate on of the crystallizer 174

The mother liquor in storage tank 204a from the second mode of operation, is fed in line 62, by pump 206 to the crystallizer 174 (FIGS. 2A and 4). The purpose of this mode of operation is to recover additional sodium azide from the mother liquor. The crystallizer 174 is operated in an evaporative mode. The feed in line 50 and in the recycle stream through heater 178 is heated to an exit temperature of about 230° F. In this evaporation mode some crystallization of potassium perchlorate occurs as well as crystallization of sodium azide.

A slurry is obtained in line 54 which contains, on a weight basis, about 50% crystals of sodium azide and about 5.2% crystals of potassium perchlorate. The major portion of this slurry is recycled, by pump 176, through the heater 178, back to the crystallizer 174. A portion of the slurry is withdrawn in line 54a and centrifuged, without washing, in centrifuge 182 (FIGS. 2B and 4). The centrifuge cake is received on screw conveyor 198, fed to dissolver 200, where the cake is redissolved, and recycled by pump 202 in line 63 (through point of connection "I") to feed tanks 164, 166, for addition to feed from a next cycle in these tanks, and for reprocessing. This is the first purge recycle stream, referred to above, with respect to the description of the first mode of operation of the crystallizer 174, and represents a means for recovering additional sodium azide from the original feed.

The third mode of operation of the crystallizer 174 is operated on a continuous basis for about 16 hours, of a one month cycle, using feed from tank 204a and recycle of the mother liquor from receiving tank 188 during the entire 16 hours of operation. Part of the mother liquor from tank 188 is also continuously purged, by pump 190, to storage tank 204. At the end of the period of this mode of operation, when the feed from tank 204a is exhausted, the mother liquor is pumped, by pump 190, to storage tank 204 (FIGS. 2A and 4). Preferably, the mother liquor is pumped through in-line filter 189 which produces a small amount of fines which are recycled to the storage tanks 164, 166.

The clear mother liquor contained in storage tank 204, from the third mode of operation, contains about 12% NaN$_3$, about 41% NaNO$_3$, about 10% KClO$_4$, and about 37% water. This is relatively high in concentrations of NaNO$_3$ and KClO$_4$, as compared to the concentration of NaN$_3$.

Fourth Mode of Operation of the Crystallizer 174

The purpose of the fourth mode of operation of the crystallizer 174 is to purge a mixed crystal stream of sodium nitrate and potassium perchlorate from the mother liquor.

The clear mother liquor, in tank 204, is diluted with about 8.5% water (based on the weight of the mother liquor in the tank), and is withdrawn in line 98, by pump 206, to crystallizer 174. The crystallizer 174 is operated in a cooling mode in conjunction with heat exchangers 172, 178, with an inlet temperature to the heat exchangers of about 212° F., and an exit temperature of about 68° F. from the heat exchangers. This produces a slurry in line 54 which contains on a weight basis about 14% crystals of sodium nitrate and about 8.1% crystals of potassium perchlorate. The major portion of the slurry is recycled, by pump 176, through the heat exchanger 178, back to the crystallizer 174. A portion of the slurry is withdrawn in line 54a and centrifuged, in centrifuge 182 (FIG. 2B) using a wash stream. A wet cake of sodium nitrate and potassium perchlorate crystals is obtained, on screw conveyor 198. These crystals are stored for reprocessing as will be described. The mother liquor, in receiving tank 188, constitutes the second purge recycle stream, referred to above with respect to the first mode of operation, and is recycled to feed tanks 164, 166 (see FIG. 4), in lines 96, 96b, 96b' and 96b" through point of connection "L" (FIGS. 2A, 2B) where it is combined with permeate feed from a next extraction and clarification step.

The composition of the mother liquor purge recycle stream is relatively high in sodium azide. The purge stream comprises about 13% sodium azide, about 30% sodium nitrate, about 2% potassium perchlorate, and about 55% water. By recycling this stream, additional sodium azide can be recovered.

The amount of sodium nitrate and potassium perchlorate crystals removed, in the wet cake, on screw conveyor 198, represents about 46% of the weight of sodium nitrate and potassium perchlorate in the feed in tank 204, at the beginning of the fourth mode of operation.

If desired, the crystallizer 174 can be operated in additional modes to separate the sodium nitrate and potassium perchlorate further from the wet cake stream obtained in this fourth mode of operation, for reuse of the sodium nitrate and potassium perchlorate in the manufacture of additional gas generating material.

If the centrifuge cake from screw conveyor 198 contains only a small amount of crystals of sodium azide, and large amounts of both sodium nitrate and potassium perchlorate, the wet cake can be redissolved in dissolver 200, and the dissolved crystal solution from dissolver 200 and a dedicated storage tank (not shown) can be processed in crystallizer 174, or a separate evaporator (not shown) by cooling to 60°–90° F. to obtain perchlorate crystals, followed by evaporation at 212° F. to obtain sodium nitrate crystals. The small amount of residual sodium azide in either type of crystal will be of no concern. This is because the potassium perchlorate crystals can be redissolved and reused, by way of example, in a coating for gas generating material. The sodium nitrate crystals can be reused, by way of example, in a passenger side formulation. The fractional crystallization to separate potassium perchlorate from sodium nitrate only need be performed once every few months.

Alternatively, the wet cake, on conveyor 198, if contaminated with a small amount of sodium azide, can be dissolved in water in dissolver 200 and ozonated, in an ozonation process to be described, to destroy the sodium azide, and then recrystallized for disposal by landfill.

This fourth mode of operation is normally carried out for only a short period of time during the total process, for instance, about 9 hours of a one month cycle, until the feed from tank 204 is exhausted.

Solids Processing Step

Figure 3:
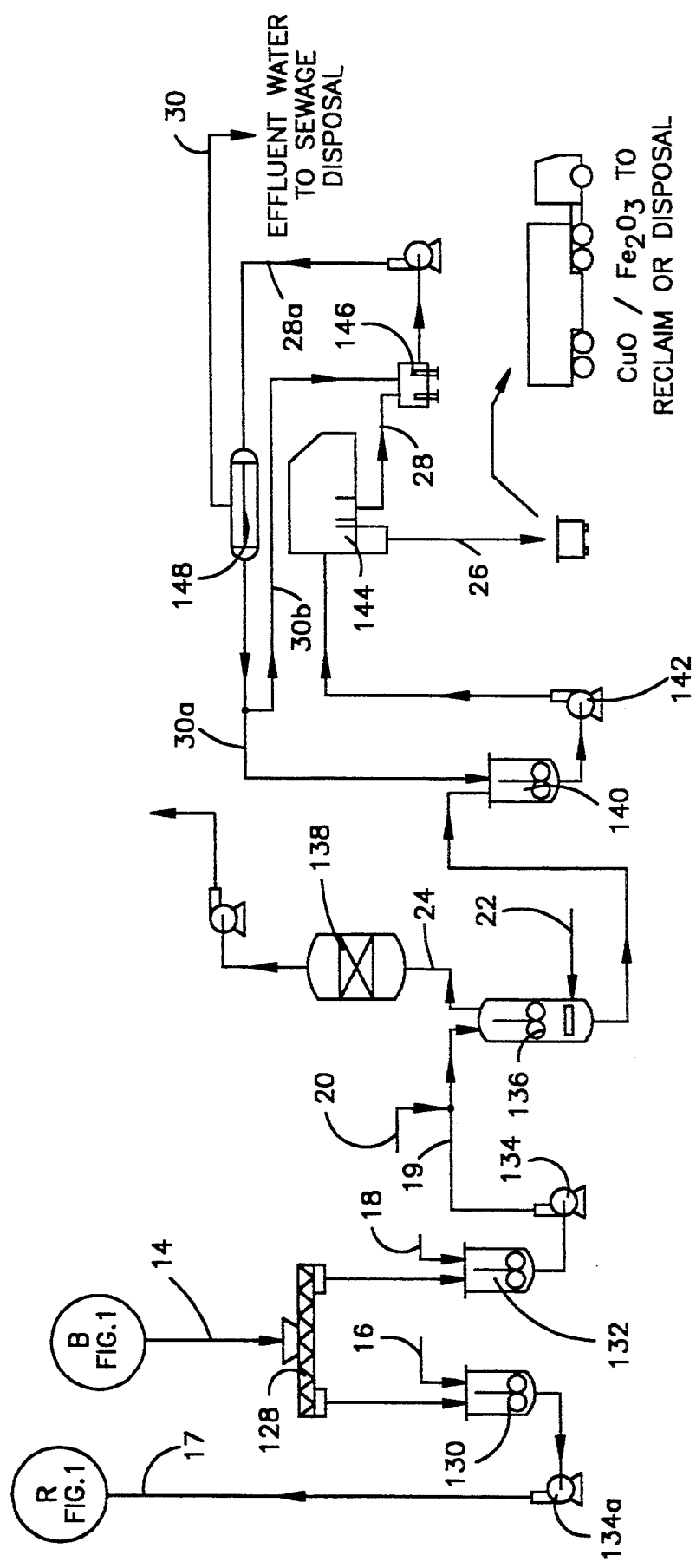
FIG. 3 is a flow diagram illustrating the solids treatment steps of the present invention for solids reclamation or disposal.

The sludge stream in line 14, FIG. 1, flows from centrifuge 122 to a solids transfer screw conveyor 128 (FIG. 3). Encircled letter "B" indicates the point of connection of line 14 of FIG. 1 with line 14 of FIG. 3. The conveyor 128, in turn, transfers the sludge stream to one of two reslurrying vessels 130 and 132. Sludge that has been reslurried once to recover additional sodium azide is transferred to reslurrying vessel 132, whereas sludge that has not been previously reslurried is transferred to reslurrying vessel 130.

Vessel 130 is provided with a water inlet line 16 and receives water. Vessel 130 is agitated until the sludge in vessel 130 is reslurried to a homogeneous slurry. This slurry is recycled to main mix vessels 116, 118 by means of slurry recycle pump 134a in line 17. Encircled letter "R" indicates the point of connection of line 17 in FIG. 3 with line 17 in FIG. 1. The purpose of this recycle is to recover any additional water soluble components contained in the sludge in line 14 from centrifuge 122.

Alternatively, if the sludge is transferred to vessel 132, it can be combined with plant water, in line 18, that may be contaminated with azide and other water soluble ingredients, and also may contain water insoluble ingredients. By way of example, the sludge stream in vessel 132, following separation, reslurrying in vessel 130, recycle, and then further separation in centrifuge 122, may contain about 5,000 ppm of residual azide. The alkali metal azides are energetic materials. This amount of azide in combination with the metal oxide can be considered hazardous for either reclaiming or landfill disposal. The mixture in vessel 132 is agitated for a sufficient period of time to obtain a homogeneous slurry. The slurry is then transferred by pump 134 in line 19 to a reaction vessel 136. Sludge from tank bottoms (including those from waste management areas outside of this process) can be added to the slurry through line 20 upstream of the reaction vessel 136. In the embodiment of the present invention illustrated in FIG. 3, the reaction vessel 136 is an ozonator. Ozone in line 22, from an ozone generator (not shown), is introduced into the reaction vessel 136. Generally, the ozone generator will produce an ozone/air mixture. A typical volume ratio of ozone to air is about 1.2:100. The ozonation in the reaction vessel 136 is carried out in accordance with the procedure set forth in application Ser. No. 703,910, filed May 22, 1991, assigned to the assignee of the present application, now U.S. Pat. No. 5,073,273. The ozonation can be carried out on a batch basis or continuous basis.

The reaction vessel preferably has baffles within the vessel which provide a means for dispersing the ozone introduced into the vessel, in line 22, throughout the slurry in the vessel. Prior to ozonation, and during ozonation if necessary, the slurry may be agitated to prevent settling or phase separation of ingredients of the slurry.

The ozonation is carried out until the azide in the slurry is decomposed substantially completely to nitrogen gas and non-energetic compounds, namely, nitrate ions, hydroxyl ions and sodium ions in the water, in accordance with the following equations:

$$NaN_3 + 3O_3 \rightarrow Na^+ + NO_3^- + N_2 + 3O_2 \quad (1)$$

$$2NaN_3 + O_3 + H_2O \rightarrow 2Na^+ + 2OH^- + O_2 + 3N_2 \quad (2)$$

There is no criticality in the rate of addition of ozone to the azide containing slurry in the reaction vessel, or in the length of time the ozonation is carried out, except that the ozonation should be carried out until substantially all of the nitrogen in the sodium azide is converted to nitrate ions ($NO_3^-$) and nitrogen gas ($N_2$). This will occur, by way of example, in a period of about seven and one-half hours.

The ozonation is preferably conducted on a continuous basis. The reaction vessel 136 is vented, in line 24, to ozone destroyer 138 to prevent the discharge of ozone to the environment.

The slurry from the reaction vessel 136, free of azides, flows to holding vessel 140. The slurry is fed from the holding vessel 140, by feed pump 142, to centrifuge 144. Instead of a centrifuge 144, a filter press can be used. The centrifuge 144 or a filter press separates the slurry into a stream containing metal oxides, in line 26, which is suitable for reclaiming, or permitted disposal, and a liquid or centrate stream in line 28, which flows to centrate receiver 146. This centrate is then passed, in line 28a, through a polishing filter 148, which produces a clear permeate, in line 30, suitable for sewage disposal. Part or all of this stream can also be recycled for use in the azide recovery facility for solids dissolution or sludge reslurrying. The more concentrated stream in line 30a or 30b is recycled to the holding vessel 140 for reprocessing.

As an alternative to ozonation, reaction vessel 136, holding vessel 140, and centrifuge 144 can be used for countercurrent washing to reduce the azide contained in the metal oxide sludge to acceptably low levels. The sludge is reslurried in vessel 136, for instance by adding water in line 22 to the sludge. The slurry mixture is then fed to holding vessel 140, and pumped to centrifuge 144 for separation of the wash solution from the metal oxide sludge.

In actual practice, the countercurrent washing would be carried out in several stages, e.g., three to five stages. In this respect, it is understood that the apparatus of FIG. 3, modified for water input in line 22, is a schematic representation only of countercurrent washing.

Thus, following the separation in the first stage in centrifuge 144, the metal oxide sludge is reslurried in a stage two, for instance in a vessel similar to vessel 136. The second stage sludge is then separated from the wash water in a second centrifuge. In the third stage, the sludge is cycled to a third vessel, also similar to vessel 136, for reslurrying, followed by third stage separation in a third stage centrifuge, and so on, for a fourth and fifth stage, if desired.

In each stage of reslurrying, the wash solution used in the sludge reslurrying is centrate derived from the next stage. In the last stage, deionized water or steam condensate is used for sludge reslurrying. The centrate from the first stage separation, which would be in line 28, if the apparatus of FIG. 3 is adapted for countercurrent washing, is recycled upstream, for instance as solvent in line 6, FIG. 1, added to premix vessel 114.

By countercurrent washing, the percent azide in the centrifuged sludge from the final wash can be reduced to less than 0.5 ppm. The ratio of wash solution to sludge which is used in the countercurrent washing depends upon the number of stages used. To reduce the azide concentration to less than 0.5 ppm, a three stage wash requires a ratio of wash solution to sludge of about 5.5. The same reduction is achieved in a four stage wash with a ratio of wash solution to sludge of only 2.5.

As further alternatives to ozonation, the metal oxide containing sludge stream in line 19, FIG. 3, can be treated by other chemical means to decompose the residual azide in the sludge stream to nitrogen and non-energetic compounds.

A first method involves immersing the sludge in an aqueous solution of sodium nitrite ($NaNO_2$) in reaction vessel 136. The slurry is then acidified to a pH less than 4 (e.g., using sulfuric acid or hydrochloric acid) to decompose the azide by the reaction:

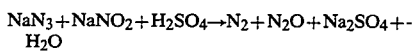
$$NaN_3 + NaNO_2 + H_2SO_4 \rightarrow N_2 + N_2O + Na_2SO_4 + H_2O$$

A second method involves immersing the sludges, in reaction vessel 136, in a solution of ceric ammonium nitrate to decompose the azide according to the reaction:

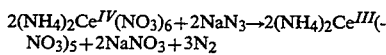
$$2(NH_4)_2Ce^{IV}(NO_3)_6 + 2NaN_3 \rightarrow 2(NH_4)_2Ce^{III}(NO_3)_5 + 2NaNO_3 + 3N_2$$

There are several other chemical methods that can also be adapted for the destruction of residual azide. For example, iodine may be used to react with sodium azide to produce nitrogen according to the following equation:

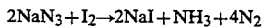
$$2NaN_3 + I_2 \rightarrow 2NaI + NH_3 + 4N_2$$

The above reaction is rapid in the presence of thiosulfate or sodium sulfide.

Excess potassium permanganate may also be used to decompose sodium azide in the presence of sulfuric acid, according to the following equation:

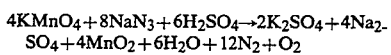
$$4KMnO_4 + 8NaN_3 + 6H_2SO_4 \rightarrow 2K_2SO_4 + 4Na_2SO_4 + 4MnO_2 + 6H_2O + 12N_2 + O_2$$

An advantage of ozonation or countercurrent washing over these other chemical methods is that ozonation and countercurrent washing are very safe. Chemical reactions at a low pH, where sodium azide is one of the reactants, can produce hydrazoic acid as one of the reaction products.

Above, with regard to the fourth mode of operation of crystallizer 174, it was mentioned that the wet cake from crystallizer 174 (FIG. 2A) following separation in the pusher centrifuge 182 (FIG. 2B) could be processed by ozonation. The ozonation would destroy residual sodium azide in the cake and would be followed by recrystallization and disposal, for instance by landfill. With this option, the crystals are dissolved in water in dissolver 200, and cycled to a dedicated storage tank (not shown). The solution of dissolved crystals periodically, for instance once every few months, is then cycled to ozonator 136 (FIG. 3) to destroy the residual azide in the solution. The azide-free liquid stream can then be re-crystallized (simply by evaporation of water) to produce a perchlorate/nitrate solid that might be sent to a municipal or industrial landfill for disposal.

Other changes and modifications in the above procedures will be apparent to those skilled in the art. For instance, instead of dissolving the water-soluble ingredients of the waste gas generating material in a premix vessel 114, countercurrent solid leaching can be used as an option.

Following solubilization of the water soluble ingredients, either in premix vessel 114 or by countercurrent leaching, the separation of water insoluble ingredients from the premix can be carried out by settling in a settling tank, in addition to or in place of the use of centrifuge 122. Settling, if used in addition to centrifuge 122, preferably is employed upstream of centrifuge 122. Settling can also be used in place of or in addition to centrifuges 182 and 144.

Reslurrying of the solids, from the first extraction step (centrifuge 122), by means of recycle pump 134a, is not essential, but is desirable, for improved extraction efficiency.

The crystallizer 174 can be operated as either a fractional crystallizer, where the filtrate from polishing filter 162 contains water soluble salts in addition to sodium azide, or a simple evaporator, where the filtrate from filter 162 contains only sodium azide. If the waste gas generating material being processed contains only sodium azide, as a water soluble ingredient, then crystallizer 174 can be a simple evaporation device. For instance, a simple vacuum evaporator can be used.

The use of dryer 186 is important to meet specifications for providing dry crystals for the manufacture of gas generating material. However, it has been proposed to manufacture gas generating material using a wet process, in which case dryer 186 would not be needed.

In place of washing centrifuge 182, batch filtering/washing exists as an option.

The removal of trace residual azide in the reaction vessel 136 from metal oxides is essential to provide a safe product for reclaiming or non-hazardous landfill disposal. Ozonation is an effective and efficient method for producing a stream which is substantially free of metal azides. Separating the azide-free metal oxides (sludges) from the wash water in centrifuge 144 is strongly preferred to reduce the sludge disposal or reclaiming load. Centrifugation is preferred, but settling tanks are less efficient, slower alternatives. Other solid/- liquid separation equipment can be used such as filter presses, belt filters or vacuum filters.

Under some circumstances it may be preferable, in the crystallization procedures, to first operate the crystallizer 174 in a mode to obtain a blend of crystals of azide and water soluble oxidant, and then operate the crystallizer 174 in a mode to obtain pure crystals of azide.

From the above description of a preferred embodiment of the invention, those skilled in the art will perceive other improvements, changes and modifications. Such improvements, changes and modifications within the skill of the art are intended to be covered by the appended claims.

What is claimed is:

1. A process for recovering an alkali metal azide from a gas generating material containing the alkali metal azide and a metal oxide reactable with the azide, comprising the steps of:
   (a) providing a quantity of said gas generating material comprising said alkali metal azide and said metal oxide;
   (b) providing a solvent in which said alkali metal azide is soluble and said metal oxide is insoluble;
   (c) mixing said solvent with said gas generating material under conditions effective to dissolve said alkali metal azide in said solvent and produce a slurry comprising a solution of said alkali metal azide and said insoluble metal oxide;
   (d) separating said slurry into a liquid stream comprising said solution of alkali metal azide and into a sludge stream comprising said metal oxide;
   (e) recovering alkali metal azide from said solution; and
   (f) treating said sludge stream following said separation to obtain a sludge stream which is substantially free of alkali metal azide.

2. The process of claim 1 further comprising the step of concentrating said liquid stream to obtain crystals of said alkali metal azide.

3. The process of claim 2 wherein said liquid stream is filtered to produce a filtrate substantially free of metal oxide prior to concentration.

4. The process of claim 3 wherein said solvent is water.

5. The process of claim 1 wherein said concentration is carried out by solvent evaporation.

6. The process of claim 1 wherein the treatment of step (f) is a chemical reaction.

7. The process of claim 6 wherein the chemical reaction is ozonation.

8. The process of claim 1 wherein the treatment of step (f) is countercurrent washing of the sludge stream to remove alkali metal azide from the sludge stream.

9. A process for recovering an alkali metal azide from a gas generating material containing the alkali metal azide and a metal oxide reactable with the azide, comprising the steps of:
   (a) providing a quantity of said gas generating material comprising said alkali metal azide and said metal oxide;
   (b) providing a solvent in which said alkali metal azide is soluble and said metal oxide is insoluble;
   (c) mixing said solvent with said gas generating material under conditions effective to dissolve said alkali metal azide in said solvent and produce a slurry comprising a solution of said alkali metal azide and said insoluble metal oxide;
   (d) maintaining the pH of the slurry at a pH effective to prevent the formation of hydrazoic acid;
   (e) separating said slurry into a liquid stream comprising said solution of alkali metal azide and into a sludge stream comprising said metal oxide;
   (f) filtering said liquid stream to produce a filtrate substantially free of metal oxide;
   (g) concentrating said filtrate to obtain substantially pure crystals of said alkali metal azide;
   (h) recovering said crystals of said alkali metal azide.

10. A process for recovering an alkali metal azide from gas generating material containing the alkali metal azide and a metal oxide reactable with the azide, wherein the composition of said gas generating material can vary, said process comprising the steps of:
    (a) providing a quantity of said gas generating material;
    (b) mixing said gas generating material with a solvent for said alkali metal azide in which said metal oxide is insoluble to produce a slurry comprising a solution of said alkali metal azide and said metal oxide;
    (c) maintaining the pH of the slurry at a pH effective to prevent the formation of hydrazoic acid;
    (d) separating said slurry into a liquid stream comprising said solution and a sludge stream comprising said metal oxide and residual alkali metal azide;
    (e) filtering said liquid stream to produce a filtrate substantially free of metal oxide;
    (f) concentrating said filtrate to obtain substantially pure crystals of said alkali metal azide; and
    (g) treating the residual alkali metal azide in said sludge stream following said separation to obtain a sludge stream containing metal oxide and being substantially free of alkali metal azide.

11. The process of claim 10 wherein the treatment of step (g) is a chemical reaction.

12. The process of claim 11 wherein the chemical reaction is ozonation.

13. The process of claim 10 wherein the treatment of step (g) is countercurrent washing.

14. The process of claim 10 wherein said gas generating material is waste gas generating material.

15. The process of claim 10 wherein said solvent is water.

16. The process of claim 9 wherein said concentration is carried out by solvent evaporation.

17. The process of claim 16 wherein said concentration is carried out in a crystallizer.

18. The process of claim 17 wherein said gas generating material contains a solvent soluble salt in addition to said alkali metal azide and said crystallizer is a fractional crystallizer.

19. The process of claim 18 wherein said salt is selected from the group consisting of a nitrate, a chlorate, a perchlorate, and combinations thereof.

20. The process of claim 17 wherein said crystals are centrifuged to produce a crystal stream having a low moisture content.

21. The process of claim 20 wherein said centrifuge is a washing centrifuge.

22. The process of claim 21 wherein said crystals are dried.

23. The process of claim 22 wherein said drying is carried out under an inert atmosphere.

24. The process of claim 22 wherein said drying is carried out under negative pressure.

25. The process of claim 10 wherein a portion of said sludge stream is washed in additional solvent and recycled to said separation step to recover additional azide.

26. The process of claim 10 wherein said sludge stream is mixed with water and reacted with ozone to destroy residual azides therein.

27. The process of claim 10 wherein the separation of said slurry into a liquid stream and a sludge stream is carried out in a centrifuge.

28. The process of claim 9 wherein said concentration is carried out in a crystallizer and further comprising the steps of:
  (i) introducing said liquid stream into a membrane filter to produce a clear permeate; and
  (ii) introducing the permeate from said membrane filter into said crystallizer.

29. The process of claim 28 wherein said permeate is preheated before crystallization.

30. A process for recovering an alkali metal azide from a waste gas generating material containing said azide and a metal oxide reactable with said azide, wherein said waste contains at least one water soluble oxidant in addition to sodium azide, said process comprising the steps of:
  (a) providing a quantity of said waste gas generating material;
  (b) mixing said waste gas generating material with water to dissolve said azide and said water soluble oxidant to produce a slurry;
  (c) separating said slurry into a liquid stream containing said azide and said water soluble oxidant and a sludge stream containing said metal oxide;
  (d) concentrating said liquid stream in a first concentration step producing pure crystals of said azide and recovering said crystals, said concentrating step producing a mother liquor;
  (e) further concentrating said mother liquor to remove a blend of crystals of said azide and said water soluble oxidant from said mother liquor and produce a concentrated mother liquor; and
  (f) subjecting said concentrated mother liquor to fractional crystallization by cooling or by evaporation to crystallize said water soluble oxidant from the mother liquor.

31. The process of claim 30 wherein said water soluble oxidant comprises sodium nitrate and/or potassium perchlorate.

32. The process of claim 30 wherein said blend of crystals of step (e) is recycled and combined with the liquid stream of step (d).

33. The process of claim 32 wherein said blend of crystals of step (e) is dissolved in water before being recycled.

34. The process of claim 30 wherein the mother liquor of step (f) is recycled and combined with the liquid stream of step (d).

35. The process of claim 30 further comprising the step of filtering the liquid stream of step (c) to produce a filtrate which is substantially free of metal oxide, wherein the pure crystals of azide recovered in step (d) are dried.

36. The process of claim 30 wherein the water soluble oxidant of step (f) is redissolved and ozonated to destroy any azide with the water soluble oxidant and said water soluble oxidant is recrystallized and reclaimed or disposed of.

37. The process of claim 30 wherein the concentration steps of (d) and (e) are carried out by evaporation.

38. A process for recovering an alkali metal azide from a waste gas generating material containing a metal oxide, said azide, and a blend of water soluble oxidants consisting essentially of sodium nitrate and potassium perchlorate, said process comprising the steps of:
  (a) providing a quantity of said waste gas generating material;
  (b) mixing said waste gas generating material with water to dissolve said azide and water soluble oxidants to produce a slurry;
  (c) separating said slurry into a liquid stream containing said azide and said water soluble oxidants and a sludge stream containing said metal oxide;
  (d) concentrating said liquid stream in a first concentration step producing pure crystals of said azide and recovering said crystals, said concentrating step producing a mother liquor;
  (e) cooling said mother liquor to fractionally crystallize potassium perchlorate from said mother liquor;
  (f) further concentrating said mother liquor to produce a blend of crystals of said azide and said potassium perchlorate and a mother liquor in which said sodium nitrate is concentrated; and
  (g) cooling and/or concentrating said concentrated mother liquor to fractionally crystallize said sodium nitrate and said potassium perchlorate therefrom.

39. The process of claim 38 including the steps of redissolving said crystals of sodium nitrate and potassium perchlorate producing a feed and fractionally crystallizing said feed to obtain crystals of sodium nitrate and crystals of potassium perchlorate.

40. The process of claim 38 wherein said blend of crystals of step (f) is recycled and combined with the liquid stream of step (d).

41. The process of claim 40 wherein said blend of crystals of step (f) are dissolved in water before being recycled.

42. The process of claim 38 further comprising the step of filtering the liquid stream to produce a filtrate which is substantially free of metal oxide, wherein the pure crystals of azide recovered in step (d) are dried.

43. The process of claim 38 wherein the sodium nitrate and potassium perchlorate crystals of step (g) are redissolved and ozonated to destroy any azide and said nitrate and perchlorate are recrystallized and reclaimed or landfilled.

44. The process of claim 38 wherein the concentration of steps (d) and (f) are carried out by evaporation.

45. A process for recovering an alkali metal azide from a gas generating material containing the alkali metal azide and a metal oxide reactable with the azide, comprising the steps of:
  (a) providing a quantity of said gas generating material comprising said alkali metal azide and said metal oxide;
  (b) providing a solvent in which said alkali metal azide is soluble and said metal oxide is insoluble;
  (c) mixing said solvent with said gas generating material under conditions effective to dissolve said alkali metal azide in said solvent and produce a slurry comprising a solution of said alkali metal azide and said insoluble metal oxide;
  (d) separating said slurry into a liquid stream comprising said solution of alkali metal azide and into a sludge stream comprising said metal oxide;
  (e) recovering alkali metal azide from said solution; and
  (f) treating said sludge stream following said separation to obtain a sludge stream which is substantially free of alkali metal, azide, said treatment being chemical decomposition of the alkali metal azide or countercurrent washing of the sludge stream.

* * * * *